United States Patent
Norton et al.

(10) Patent No.: US 10,721,253 B2
(45) Date of Patent: Jul. 21, 2020

(54) POWER CIRCUITRY FOR SECURITY CIRCUITRY

(71) Applicant: HEWLETT PACKARD ENTERPRISE DEVELOPMENT LP, Houston, TX (US)

(72) Inventors: John Norton, Houston, TX (US); Dwight Riley, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 88 days.

(21) Appl. No.: 15/711,600

(22) Filed: Sep. 21, 2017

(65) Prior Publication Data
US 2019/0089724 A1    Mar. 21, 2019

(51) Int. Cl.
| | |
|---|---|
| H04L 29/06 | (2006.01) |
| G06F 1/28 | (2006.01) |
| G06F 1/26 | (2006.01) |
| G06F 21/71 | (2013.01) |
| G06F 21/81 | (2013.01) |
| H05K 7/14 | (2006.01) |
| G06F 21/86 | (2013.01) |
| G06F 1/18 | (2006.01) |

(52) U.S. Cl.
CPC .......... *H04L 63/1425* (2013.01); *G06F 1/189* (2013.01); *G06F 1/263* (2013.01); *G06F 1/266* (2013.01); *G06F 1/28* (2013.01); *G06F 21/71* (2013.01); *G06F 21/81* (2013.01); *G06F 21/86* (2013.01); *H05K 7/1495* (2013.01)

(58) Field of Classification Search
CPC ..... H04L 63/1425; G06F 1/263; G06F 1/266; G06F 1/28
See application file for complete search history.

(56) References Cited

U.S. PATENT DOCUMENTS

| | | | |
|---|---|---|---|
| 7,009,510 B1 * | 3/2006 | Douglass | G08B 25/08 340/3.1 |
| 8,645,735 B1 | 2/2014 | Ardis et al. | |
| 8,832,402 B2 | 9/2014 | Goss et al. | |

(Continued)

OTHER PUBLICATIONS

SafeNet (Level 3 Non-Proprietary Security Policy for Luna® Backup HSM Cryptographic Module, Apr. 13, 2016, 49 pages) (Year: 2016).*

(Continued)

*Primary Examiner* — Oleg Korsak
(74) *Attorney, Agent, or Firm* — Hewlett Packard Enterprise Patent Department (57) ABSTRACT

In some examples, a modular server includes an auxiliary power source and an auxiliary power system. The auxiliary power system includes a battery terminal to electrically couple to the auxiliary power source. The auxiliary power system further includes power terminals. Each power terminal is electrically coupled to a respective resource received within a modular server enclosure. The auxiliary power system further includes a power circuitry electrically coupled to the battery terminal and to each of the power terminals. The auxiliary power system also includes security circuitries. Each security circuitry corresponds to a respective resource received within a modular server enclosure. The auxiliary power source supplies power to the plurality of security circuitries.

13 Claims, 7 Drawing Sheets

(56) References Cited

U.S. PATENT DOCUMENTS

| | | | |
|---|---|---|---|
| 8,868,957 B2 * | 10/2014 | Davis | G06F 1/30 |
| | | | 320/127 |
| 9,444,622 B2 | 9/2016 | Laffey | |
| 2015/0365227 A1 | 12/2015 | Billau et al. | |
| 2015/0365435 A1 * | 12/2015 | Billau | H04L 63/20 |
| | | | 726/1 |

OTHER PUBLICATIONS

Halderman, J.A. et al.; "Lest We Remember: Cold-boot Attacks on Encryption Keys"; May 2009; 8 pages.

* cited by examiner

POWER CIRCUITRY FOR SECURITY CIRCUITRY

BACKGROUND

Servers may be used in mission-critical and confidential capacities by companies and governments. The sensitive information contained on such servers may be of interest to nefarious actors (e.g. government agencies, hackers, corporate espionage). In some cases, nefarious actors can physically tamper with the servers and compromise security features such as encryption in order to gain access to the sensitive information contained on the servers. Certain types of servers may be modular in nature, allowing resources (e.g. modules) to be inserted and removed to reconfigure the server. In modular servers, sensitive information may be contained on multiple resources within the server enclosure.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain figures may omit duplicate labels where advantageous for the sake of clarity.

DETAILED DESCRIPTION

Certain server systems include modular enclosures. These modular enclosures receive resources that perform various server tasks (compute, storage, networking, etc.). In some examples, the resources may be nodes that each perform multiple server tasks. During manufacturing of these modular server systems, certain resources may be pre-loaded with security features, including encryption keys. In some instances, nefarious actors may compromise the security of servers after manufacture, such as during shipment or elsewhere in the supply chain or once installed in the customer's data center, without the knowledge of the manufacturer or the customer.

In a modular enclosure, each resource may be manufactured separate from the modular enclosure and separate from other resources. As such, an anti-tampering system would be distributed across multiple independent components. For example, an auxiliary power source that may be used to power security circuitry of the anti-tampering system could be located in a first resource, a security processor could be located in a second resource, and security circuitry for maintaining and zeroing (erasing) secrets could be located on every resource containing a secret.

Security circuitry may be enabled during manufacture once secrets such as encryption keys are loaded onto the server. During transport and during times when the server is not supplied with main power, the security circuitry may draw power from an auxiliary power source, such as a battery. In some examples, the security circuitry may be capable of operating for an extended period of time on auxiliary power. Security circuitry may include a security processor located with a baseboard management controller (BMC) resource, volatile memory, non-volatile memory, zeroization circuitry, anti-tampering sensors, and one or more auxiliary power source (e.g. backup battery).

Once enabled without main power, volatile memory and the security processor draw power from the backup battery. The security processor monitors the anti-tampering sensors for indications of tampering, the volatile memory actively retains the secret loaded within the volatile memory. Upon detection of a security intrusion, the security processor initiates anti-intrusion protocols, which may include supplying power to zeroization circuitry associated with the volatile memory and the non-volatile memory. In some examples, zeroization circuitry associated with the volatile memory engages in passive zeroization by removing power from the volatile memory. In some other examples, zeroization circuitry associated with the volatile memory engages in active zeroization by overwriting the secret in memory. Active zeroization may remove residual indications of the secret that are retained in memory circuitry, because volatile memory may retain evidence of the secret in capacitors and other components that could be discovered through forensic means. Similarly, zeroization circuitry of non-volatile memory may engage in active zeroization by overwriting the secret in memory. In some examples, the data used to overwrite the secret is random data, rather than all zeroes as implied by the name "zeroization." It may be possible to forensically discover a secret previously residing in memory that has been overwritten by all zeroes, therefore a secret may be overwritten with random data.

In some examples, auxiliary power is transferred between resources in the modular server enclosure through power terminals. A power terminal may include a complementary pair of adapters that electrically couple when a resource is received in the modular server enclosure. Also, in this disclosure, power terminals on resources including auxiliary power sources may be called "battery terminals" to differentiate them from power terminals of a resource that receives auxiliary power. Power terminals may share the same electrical bus such that power can be shared by multiple power terminals from a singular auxiliary power source.

Figure 1:
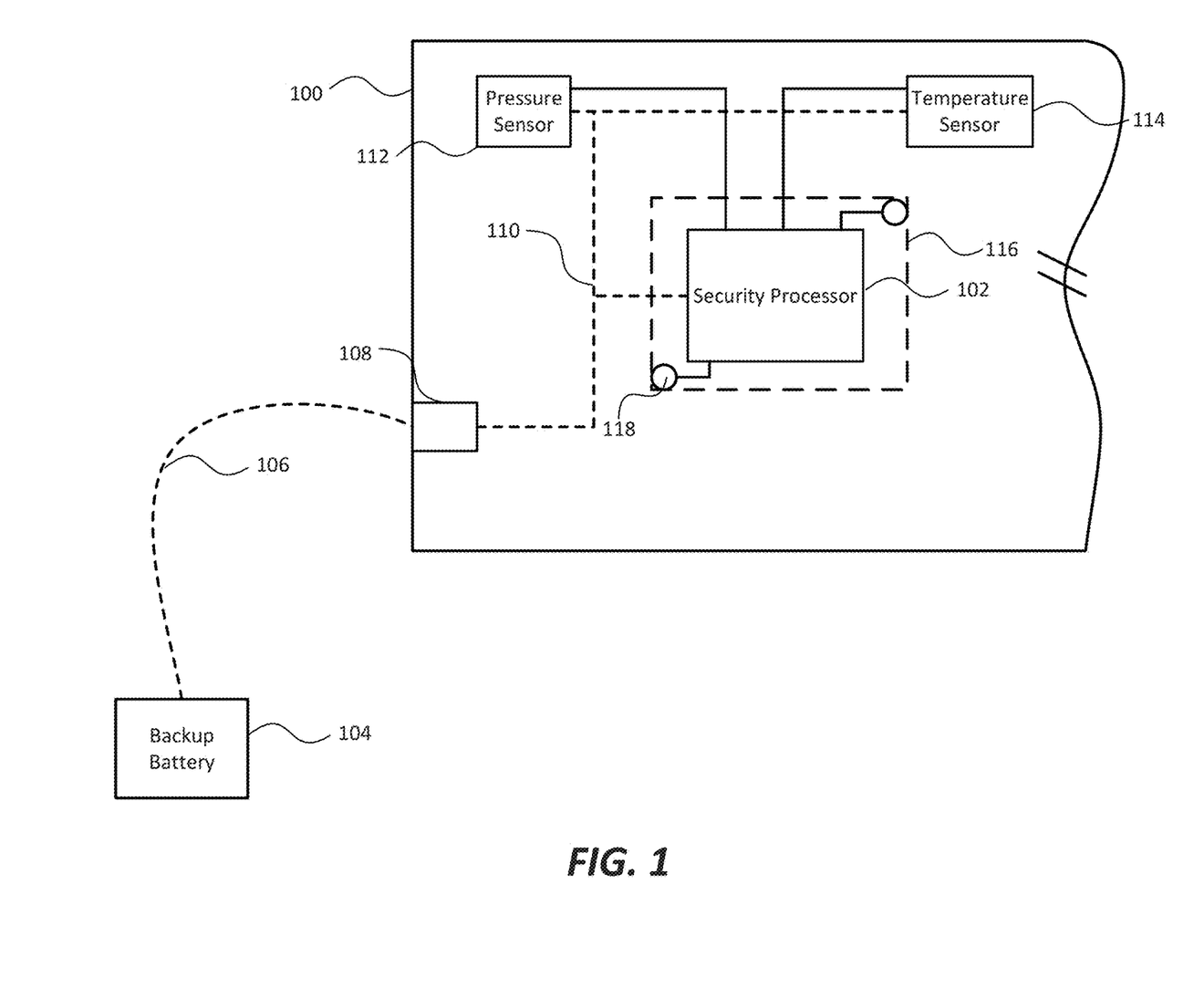
FIG. 1 illustrates example security circuitry powered by an example auxiliary power source.

In FIG. 1, an example security processor is illustrated coupled to an auxiliary power source. In some examples, a baseboard management controller (BMC) 100 contains a security processor 102. Auxiliary power source 104 may be coupled to BMC 100 through external traces 106 and via power terminal 108. Security processor 102, pressure sensor 112, and temperature sensor 114 are coupled to power terminal 108 through internal traces 110. Security processor 102 is enclosed in a secure enclosure 116, which is secured by active retention hardware 118.

In some examples, auxiliary power source 104 provides direct current power through external traces 106 to BMC 100. The direct current power is received at power terminal 108 and transferred through BMC 100 via internal traces 110. In certain examples, the direct current power is supplied to security processor 102, pressure sensor 112, and temperature sensor 114. In certain other examples, the direct current power is supplied to security processor 102, and security processor 102 supplies power to pressure sensor 112 and temperature sensor 114. Although FIG. 1 illustrates a pressure sensor 112 and a temperature sensor 114 on BMC 100, examples may include any number and type of sensor located on BMC 100 or anywhere else in the server enclosure. In some examples, a bidirectional data line couples security processor 102 with each sensor 112 and 114.

Pressure sensor 112 may be arranged such that an attempt to open or remove components of the server enclosure (e.g. resources, modules, covers, etc.). In some examples, multiple pressure sensors 112 are arranged on multiple resources so that attempts to open or remove any one of them results in security processor 102 being notified. Similarly, multiple temperature sensors 114 may be arranged on multiple resources so that environmental temperatures outside an acceptable range in any one of them results in security processor 102 being notified.

In some examples, security processor 102 is protected from tampering by secure enclosure 116. Secure enclosure 116 may be attached to BMC 100 by active retention hardware 118. Active retention hardware 118 may notify security processor 102 of attempted removal of secure enclosure 116. In some examples, active retention hardware 118 includes a screw and an electrically conductive threaded opening, so that when the screw retains secure enclosure 116, an electrical circuit is completed with security processor 102, notifying security processor 102 of a status of the secure enclosure 116. In some other examples, the electric circuit with security processor 102 is completed in a different matter such that when secure enclosure 116 is tampered with, security processor 102 is notified.

Auxiliary power source 104 may be included in a resource (e.g. a storage resource, a compute resource, a front port resource, etc.). In some examples, the resource may be a lockable resource so that auxiliary power source 104 cannot be removed without means of unlocking the resource. In certain examples, all resources containing security circuitry (e.g. security processors, volatile memory, non-volatile memory, zeroization circuitry, anti-tampering sensors, auxiliary power sources, etc.) are lockable. Lockable resources may include a lock within the resource that, when engaged, retains the resource within the server enclosure. In some other examples, lockable resources include protrusions that retain the resource within the server enclosure when a lockable portion of the server enclosure is engaged.

In an example operation of example security circuitry of FIG. 1, security processor 102 on BMC 100 is covered by secure enclosure 116 to prevent tampering with security processor 102. Security processor 102 is enabled and monitors pressure sensor 112, temperature sensor 114, and active retention hardware 118. Security processor 102 draws power from auxiliary power source 104 through external traces 106, power terminal 108 and internal traces 110. Pressure sensor 112 and temperature sensor 114 also draw power from auxiliary power source 104, which is located on a separate resource within the modular server enclosure. Upon an attempt by a nefarious actor to open or remove BMC 100, pressure sensor 112 notifies security processor 102. Security processor 102 executes commands to protect secrets stored within the server. In some examples, security processor 102 stores a record of the attempted tampering in a security log. In certain examples, security processor 102 sends a command to security circuitry on resources (not shown) containing secrets to irretrievably delete the secrets. Upon an administrator issuing a disable command to BMC 100, security processor 102 no longer monitors pressure sensor 112, temperature sensor 114, and active retention hardware 118.

Figure 2:
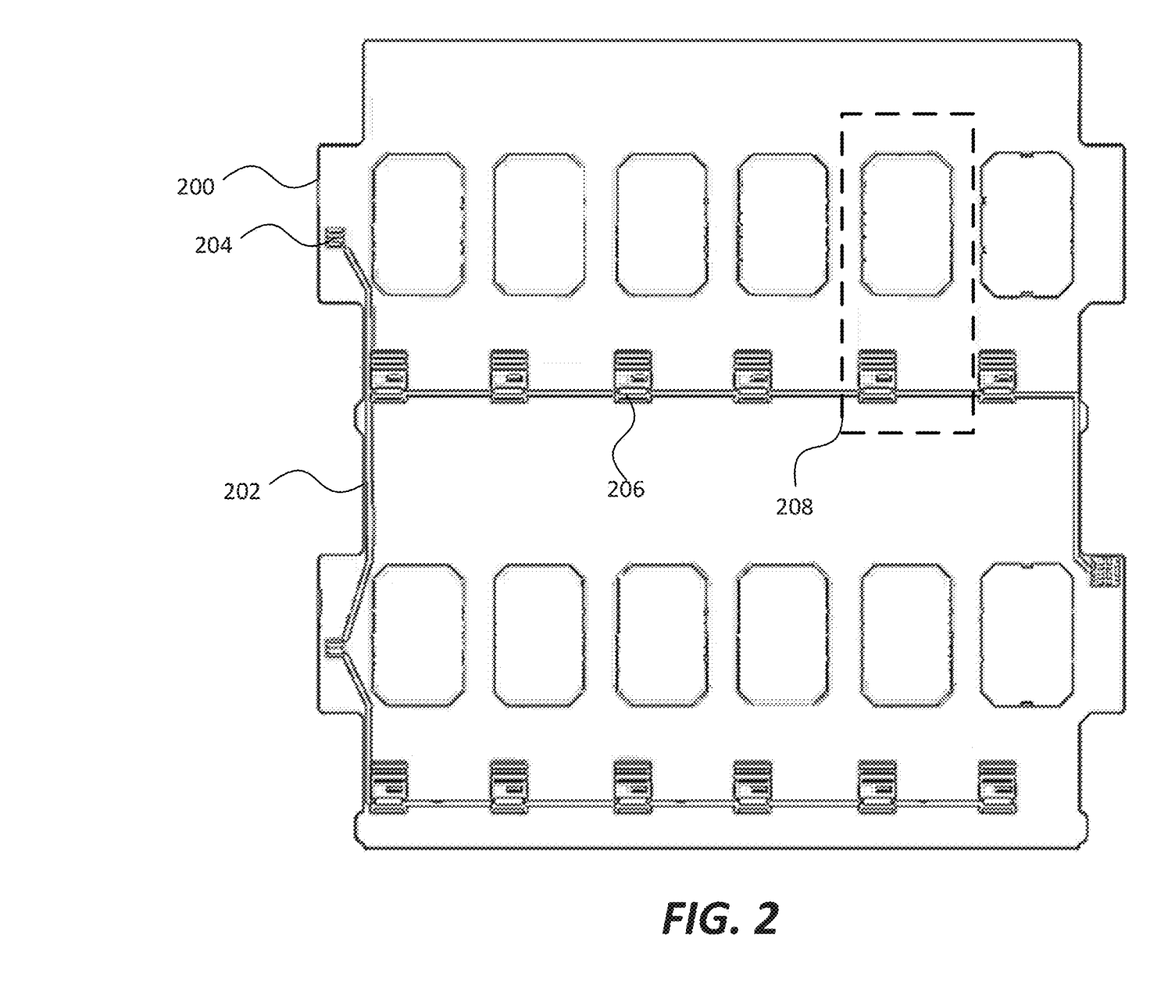
FIG. 2 illustrates an example midplane with auxiliary power circuitry.

FIG. 2 illustrates an example midplane that receives resources in a modular server enclosure. Midplane 200 contains auxiliary power circuitry 202. Auxiliary power circuitry 202 may provide a direct current signal (e.g. 3.3V) to resources coupled to midplane 200 (and thus retained in the server enclosure). Auxiliary power circuitry 202 is coupled to auxiliary power adapters 204 and 206. Auxiliary power adapter 204 may receive a first type of resource and auxiliary power adapter 206 may receive a second type of resource. In certain examples, auxiliary power adapter 204 may couple to a complimentary power adapter on a management resource (e.g. front port module, composer module) to create a power terminal. In some examples, auxiliary power adapter 206 may couple to a complimentary power adapter on a data resource (e.g. storage module, compute module, fabric module) to create a power terminal. Resources may be retained in resource bays 208 of midplane 200.

In some examples, a resource is coupled to auxiliary power adapter 204. The resource may contain an auxiliary power source to output a direct current signal (in such an example, a power terminal created by auxiliary power adapter 204 coupling to a complementary power adapter of the resource may be referred to as a "battery terminal"). The auxiliary power source may provide power to auxiliary power circuitry 202. In some examples, the auxiliary power source supplies power to other auxiliary power adapters 204 and 206 so that, when resources are coupled to resource bays 208 and main power is not provided to the server, power is provided to security circuitry of each resource from the auxiliary power source through auxiliary power circuitry 202 and through resource terminals created by the coupling of auxiliary power adapters 204 and 206 with respective complementary power adapters. In certain examples, the resource containing the auxiliary power source may be locked to the server enclosure so that power cannot be removed from auxiliary power circuitry 202 without means of unlocking the resource. In some examples, multiple resources contain auxiliary power sources, and each of the resources is coupled to a complementary resource bay 208. In certain such examples, power is provided from compute module batteries (e.g. megacell).

In an example operation of an example midplane 200, one or more resources containing auxiliary power sources are received in resource bays 208 of midplane 200, which is received in the server enclosure. One or more resources containing security circuitry are also received in resource bays 208 of midplane 200. Power is transferred from the auxiliary power sources to the security circuitries through auxiliary power circuitry 202 of midplane 200. Resources are coupled to auxiliary power circuitry 202 through resource terminals created when auxiliary power adapters 204 and 206 are coupled to complementary power adapters, respectively. Upon initialization of the security system during manufacture of the server, the resources containing auxiliary power sources and/or security circuitries are locked to the server enclosure, and a security processor is initialized. In some examples, the security processor monitors the status of sensors within the server enclosure. Upon receiving a notification from a sensor of a status that indicates an intrusion or compromise of the server enclosure, the security processor commands security circuitries of resources that contain secrets to irreparably delete the secrets. In some examples, each security circuitry receives power from auxiliary power circuitry 202 and zeroizes the secret upon receipt of the command from the security processor. In certain examples, some or all of the sensors may receive power from auxiliary power circuitry 202. Upon an administrator authenticating themselves, they may issue a command that disables the security circuitries, thus preventing the secret from being zeroized when an intrusion is detected. In some examples, disabling the security circuitries prevents intrusions from being detected. In some other examples, disabling the security circuitries alters the behavior of the security processor so that when an intrusion is detected, the security processor does not send a command to zeroize the secret.

Figure 3:
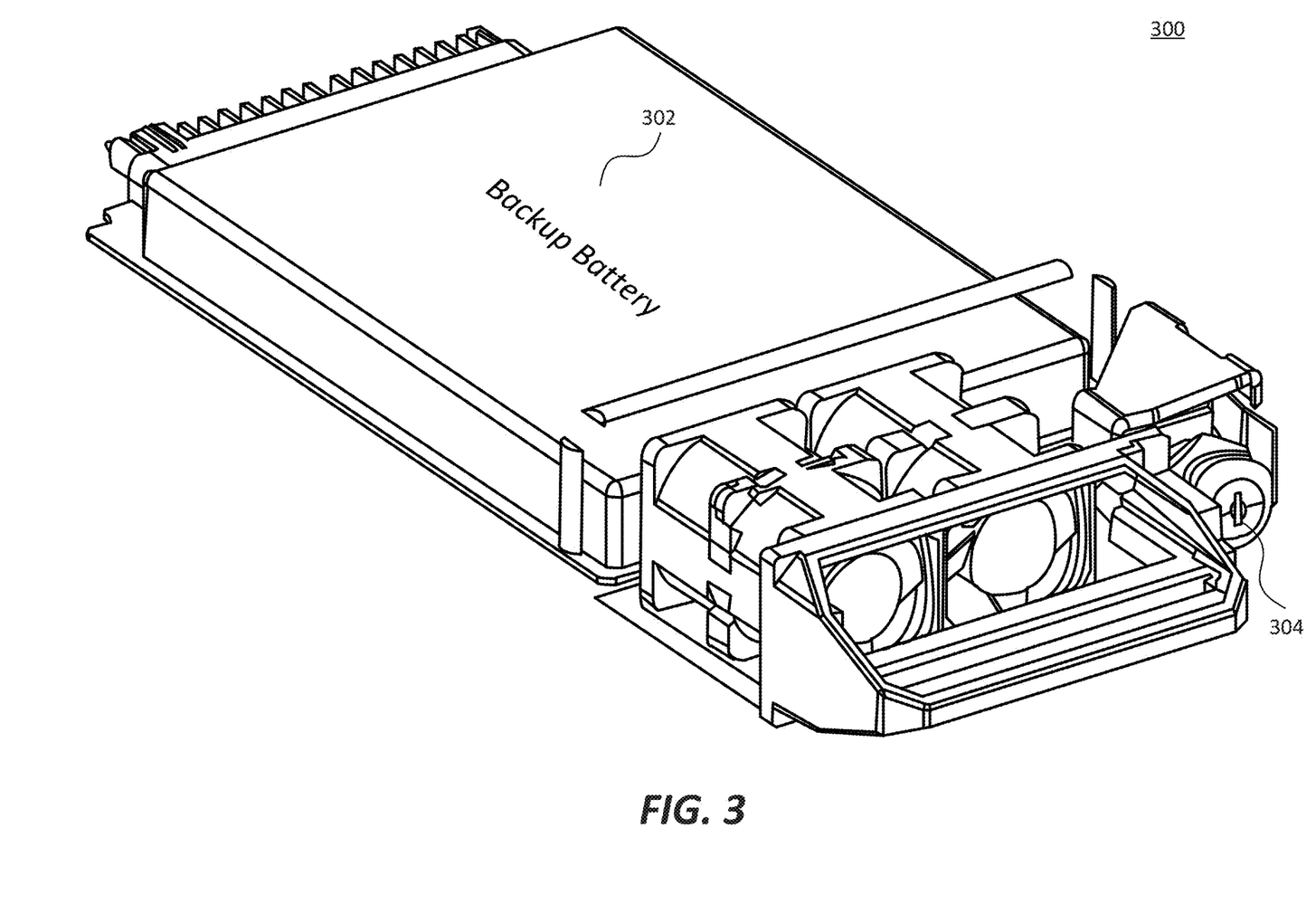
FIG. 3 illustrates an example lockable power supply including an auxiliary power source.

FIG. 3 illustrates an example power supply resource containing an auxiliary power source and a lock. Power supply resource 300 includes auxiliary power source 302 and lock 304. In some examples, power supply resource 300 can be received in a modular server enclosure. In certain examples, an auxiliary power adapter of power supply resource 300 couples with a complementary power adapter of a midplane of the modular server enclosure to create a battery terminal that provides direct current auxiliary power to security circuitry retained in the modular server enclosure. Auxiliary power source 302 may be electrically coupled to the auxiliary power adapter of power supply resource 300 such that when power supply resource 300 is retained in the modular server enclosure, the power adapter of the midplane couples with the complementary auxiliary power adapter of power supply resource 300 to create a battery terminal. Auxiliary power source 302 may provide a direct current electrical signal across the battery terminal.

In some examples, lock 304 retains power supply resource 300 within the modular server enclosure. In certain examples, engaging lock 304 extends a retainer mechanism (e.g. a metal rod) into a complementary receiver in the modular server enclosure. In some examples, power supply resource 300 contains a sensor that notifies a security processor when power supply resource 300 is tampered with.

In certain example operations, power supply resource 300 is inserted into the modular server enclosure alongside other power supply resources. Certain of the power supply resources supply main power to resources of the modular server enclosure and certain other of the power supply resources (e.g. power supply resource 300) supply auxiliary power to security circuitries contained on the resources. In some examples, power supply resource 300 supplies both main power and auxiliary power.

Figure 4:
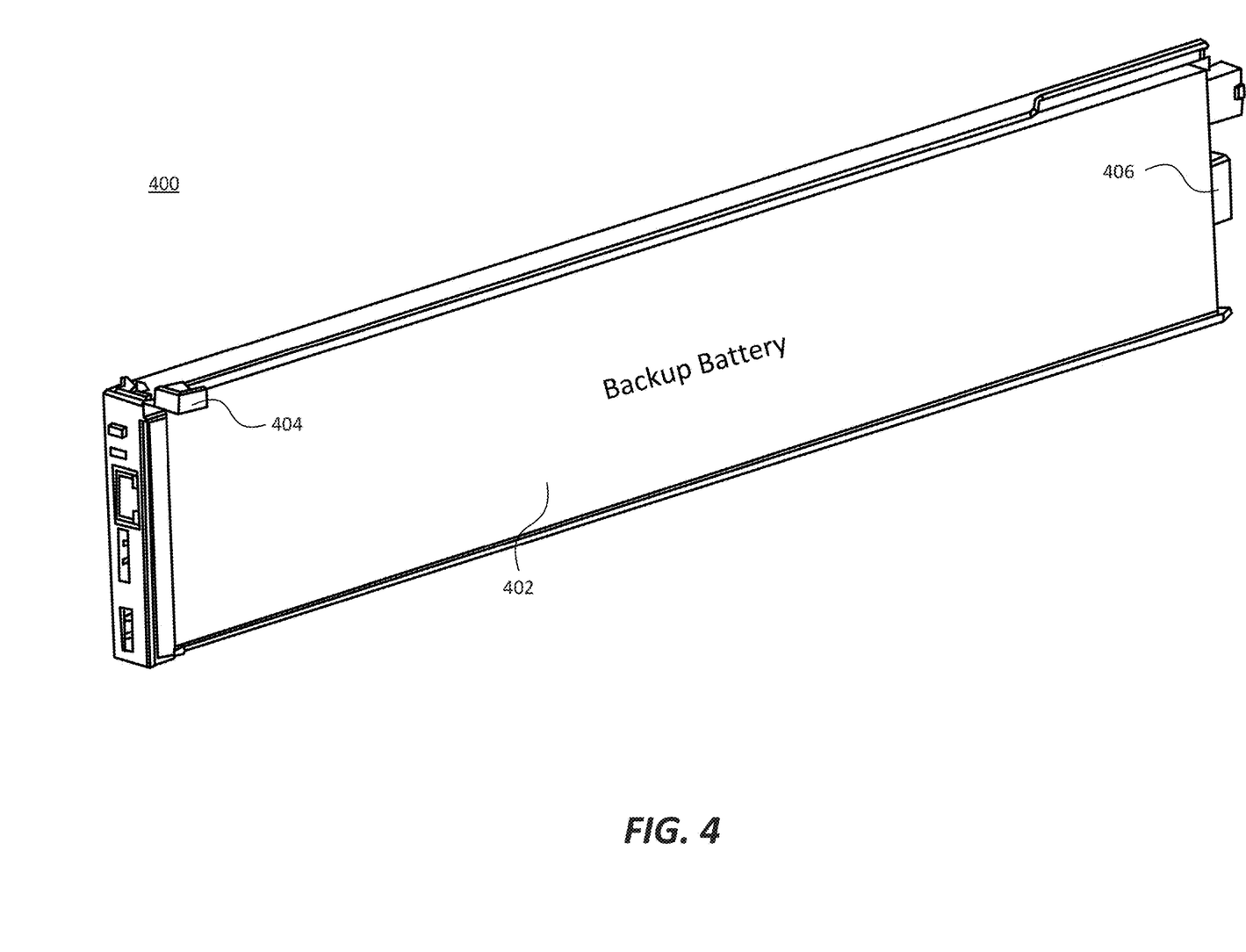
FIG. 4 illustrates an example front port resource including an auxiliary power source.

FIG. 4 illustrates an example front port resource containing an auxiliary power source. Front port resource 400 may include an auxiliary power source 402 and a retainer latch 404. In some examples, front port resource 400 may retain auxiliary power source 402 in an open region of front port resource 400 such that auxiliary power source 402 does not require modification of the modular server enclosure to retain front port resource 400 when auxiliary power source 402 is retained within front port resource 400. Front port resource 400 may provide auxiliary power from auxiliary power source 402 to the server through auxiliary power adapter 406. Similar to features discussed in relation to prior figures, auxiliary power adapter 406 may couple with a complementary power adapter of the server (e.g. of the midplane) to create a battery terminal.

In some examples, front port resource 400 includes retainer latch 404. Retainer latch 404 interfaces with a complementary retaining structure of the modular server enclosure such that, when assembled, front port resource 400 cannot be removed without disengaging a lock of the modular server enclosure. In certain examples, a bevel of the modular server enclosure includes a lock such that when the bevel is closed and the lock is engaged, retainer latch 404 prevents front port resource 400 from being removed from the modular server enclosure. The bevel may close over the front face of front port resource 400 and the bevel may contain a cutout so that ports and indicators on the front face of front port resource 400 are accessible, even though front port resource 400 cannot be removed from the modular server enclosure.

In certain examples, front port resource 400 includes security circuitry. In such examples, power may be supplied from auxiliary power source 402 to the security circuitry of front port resource 400 as well as supplied to other security circuitries of other modules through auxiliary power adapter 406.

Figure 5:
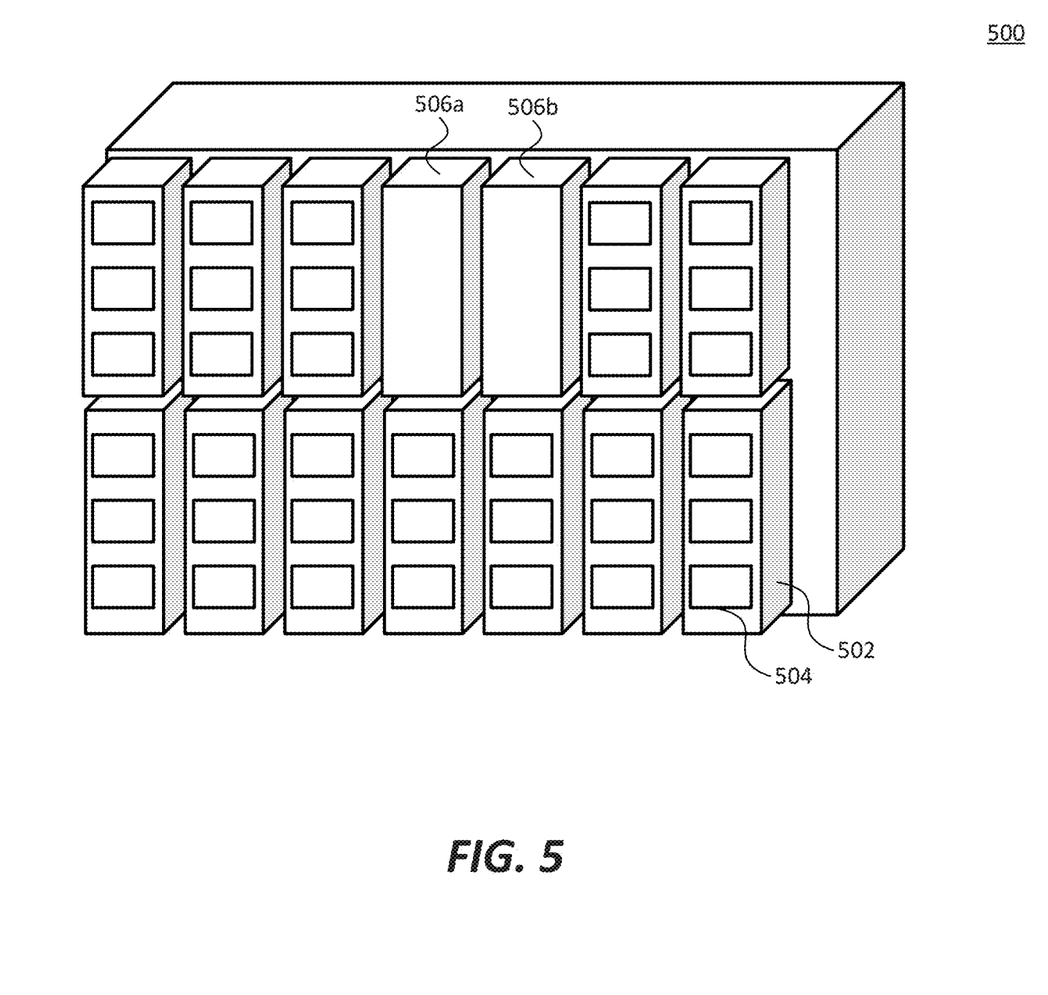
FIG. 5 illustrates an example storage resource including auxiliary power sources.

FIG. 5 illustrates an example storage resource including auxiliary power sources. Storage resource 500 includes storage racks 502 which each receive storage units 504. Storage resource 500 also includes auxiliary power sources 506a and 506b.

In some examples, storage resource 500 is received in a modular server enclosure. In certain examples, storage resource 500 is received into more than one resource bay of the modular server enclosure. Storage resource 500 may be lockable so that it cannot be removed and storage racks 502 cannot be removed from it without disengaging a lock. In some examples, individual storage racks 502 may be lockable so that other storage racks 502 may be altered or removed.

Auxiliary power sources 506a and 506b may be shaped to be received in storage bays of storage resource 500. In some examples, each storage bay includes rails that receive complementary rails of a storage rack 502 or an auxiliary power source 506a-b. Although FIG. 5 illustrates two auxiliary power sources 506a-b, this disclosure contemplates any number of auxiliary power sources being retained in storage resource 500. In some examples, auxiliary power source 506a is electrically coupled to auxiliary power source 506b, which is electrically coupled to an auxiliary power adapter of storage resource 500. In certain examples, storage resource 500 contains power circuitry that regulates the signal output on the auxiliary power adapter from auxiliary power sources 506a-b. The auxiliary power adapter of storage resource 500 may couple with a complementary power adapter of the server (e.g. of the midplane) when storage resource 500 is received in the modular server enclosure, creating a battery terminal between storage resource 500 and the server. The battery terminal may provide a direct current signal to auxiliary power circuitry of the server, which may provide power to security circuitries of other resources.

Figure 6A:
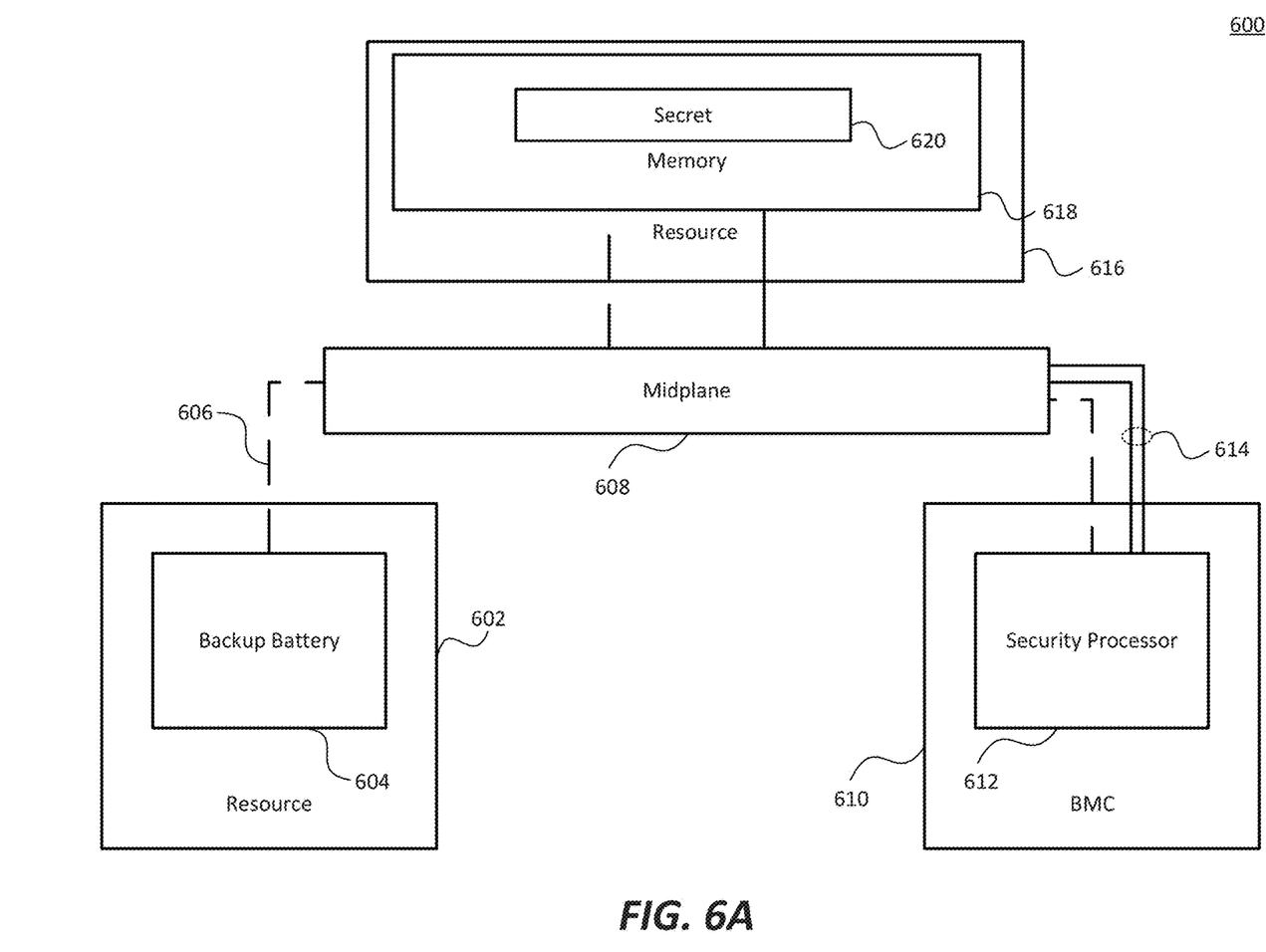
FIG. 6A illustrates an example security circuitry powered by an auxiliary power source.

FIG. 6A illustrates an example modular server including an auxiliary power system. Modular server 600 includes a resource 602 including an auxiliary power source 604, power circuitry 606, a midplane 608, a BMC 610 including a security processor 612, a control line 614, and a resource 616 including a memory 618 containing a secret 620. Auxiliary power source 604 is coupled to midplane 608 through power circuitry 606. Security processor 612 is coupled to midplane 608 through power circuitry 606 and control line 614. Memory 618 is coupled to midplane 608 through power circuitry 606 and control line 614.

In some examples, auxiliary power source 604 is coupled to power circuitry 606 through a battery terminal. The battery terminal may include an auxiliary power adapter of resource 602 coupled to a power adapter of midplane 608. In some examples, auxiliary power source 604 is charged when the modular server receives main power, and discharges when no main power is provided. In some other examples, auxiliary power source 604 is charged when the modular server receives main power, and discharges at all times, providing power to security circuitry independent of the main power. In yet some other examples, auxiliary power source 604 is charged prior to manufacture of the modular server, and discharges while the modular server is transported from its site of manufacture to its site of operation. In certain examples, auxiliary power source 604 is charged so that it will discharge for a predetermined duration of time before running out of charge.

In certain examples, auxiliary power source 604 is enclosed in resource 602 and resource 602 is locked in a modular server enclosure. In some examples, resource 602 includes a lock that, when engaged, interfaces with the modular server enclosure to prevent removal or opening of resource 602. In some other examples, resource 602 includes a retainer latch that interfaces with a lockable portion of the modular server enclosure (e.g. a bevel) to prevent removal or opening of resource 602. In certain examples, resource 602 contains a sensor that notifies BMC 610 when resource 602 is opened or removed.

Auxiliary power source 604 may supply a direct current signal to modular server 600 through power circuitry 606. In some examples, auxiliary power source 604 is connected to power circuitry 606 through a battery terminal. Midplane 608 may contain electrical traces of power circuitry 606 that route auxiliary power from auxiliary power source 604 to other resources throughout modular server 600 (e.g. resource 616 and BMC 610).

Security processor 612 of BMC 610 may receive auxiliary power from auxiliary power source 604 through via midplane 608 and through a power terminal that couples midplane 608 to BMC 610. Security processor 612 may be coupled a sensor via a control line 614. Control line 614 may be a bidirectional communication line through which security processor 612 is notified of the status of the sensor. In some examples, security processor 612 can enable and disable the sensor via a command transmitted through control line 614. In some other examples, the sensor is always enabled when power is provided to it from auxiliary power source 604.

Resource 616 includes memory 618 which contains a secret 620. In some examples, secret 620 may be an encryption key loaded into memory 618 during manufacture of modular server 600. In some examples, security processor 612 is enabled when secret 620 is loaded into memory 618.

In certain examples, memory 618 is non-volatile memory, and resource 616 contains security circuitry that is powered by auxiliary power source 604. The security circuitry may receive a command from security processor 612 to irretrievably delete secret 620. In some examples, the security circuitry uses power from auxiliary power source 604 to zeroize secret 620 in memory 618. For example, the security circuitry may overwrite portions of memory 618 that contain secret 620 with random data.

In certain other examples, memory 618 is volatile memory, and both memory 618 and security circuitry of resource 616 are powered by auxiliary power source 604. Similarly to the non-volatile memory examples, the security circuitry may receive a command from security processor 612 to irretrievably delete secret 620. In some examples, the security circuitry removes power from memory 618, resulting in secret 620 being deleted. In certain examples, the security circuitry overwrites portions of memory 618 containing secret 620 prior to removing power from memory 618 in order to frustrate forensic attempts to retrieve secret 620. For example, even with power removed from memory 618, residual charges may still exist in capacitors of memory 618 which can be used to determine secret 620. However, when zeroized, secret 620 may be irretrievably deleted.

In one example operation of an example modular server 600, resource 602, BMC 610, and resource 616 are manufactured. Resource 602 is manufactured to include auxiliary power source 604. BMC 610 is manufactured to include security processor 612. Resource 616 is manufactured to include memory 618, which is loaded with secret 620 (e.g. an encryption key) during manufacture. In some examples, secret 620 is loaded as part of an operating system being loaded into memory 618. In certain examples, memory 618 is a random access memory (RAM). In certain other examples, memory 618 is a drive memory (e.g. HDD, SSD). A modular server enclosure is assembled, and midplane 608 is retained within the modular server enclosure. Resources are then inserted into the modular server enclosure, and couple with midplane 608. An auxiliary power adapter of resource 602, when resource 602 is received in the modular server enclosure, couples with a complementary power adapter of midplane 608, creating a battery terminal that transfers power from auxiliary power source 604 to power circuitry 606. Similarly, power terminals may be created when BMC 610 and resource 616 are received in the modular server enclosure. Once resource 602, BMC 610, and resource 616 are retained in the modular server enclosure, auxiliary power source 604 supplies power to security processor 612 and memory 618 (and security circuitry on resource 616 that is associated with memory 618). Security processor 612 is then enabled and monitors sensors installed in and on various components of modular server 600. During transit and other supply chain activities, if sensors of modular server 600 detect an attempted unauthorized intrusion into modular server 600 (e.g. removal of a resource, opening of a resource, temperatures out of a normal range, etc.), security processor 612 executes anti-intrusion instructions, which may include irretrievably deleting secret 620 from memory 618. Security processor 612 may send a command to memory 618 (or the security circuitry associated with memory 618) to delete secret 620. Once modular server 600 is received by a customer and installed in a customer site, an authenticated administrator may disable the anti-intrusion instructions of security processor 612 so that authorized intrusions may occur without security 620 being deleted.

Figure 6B:
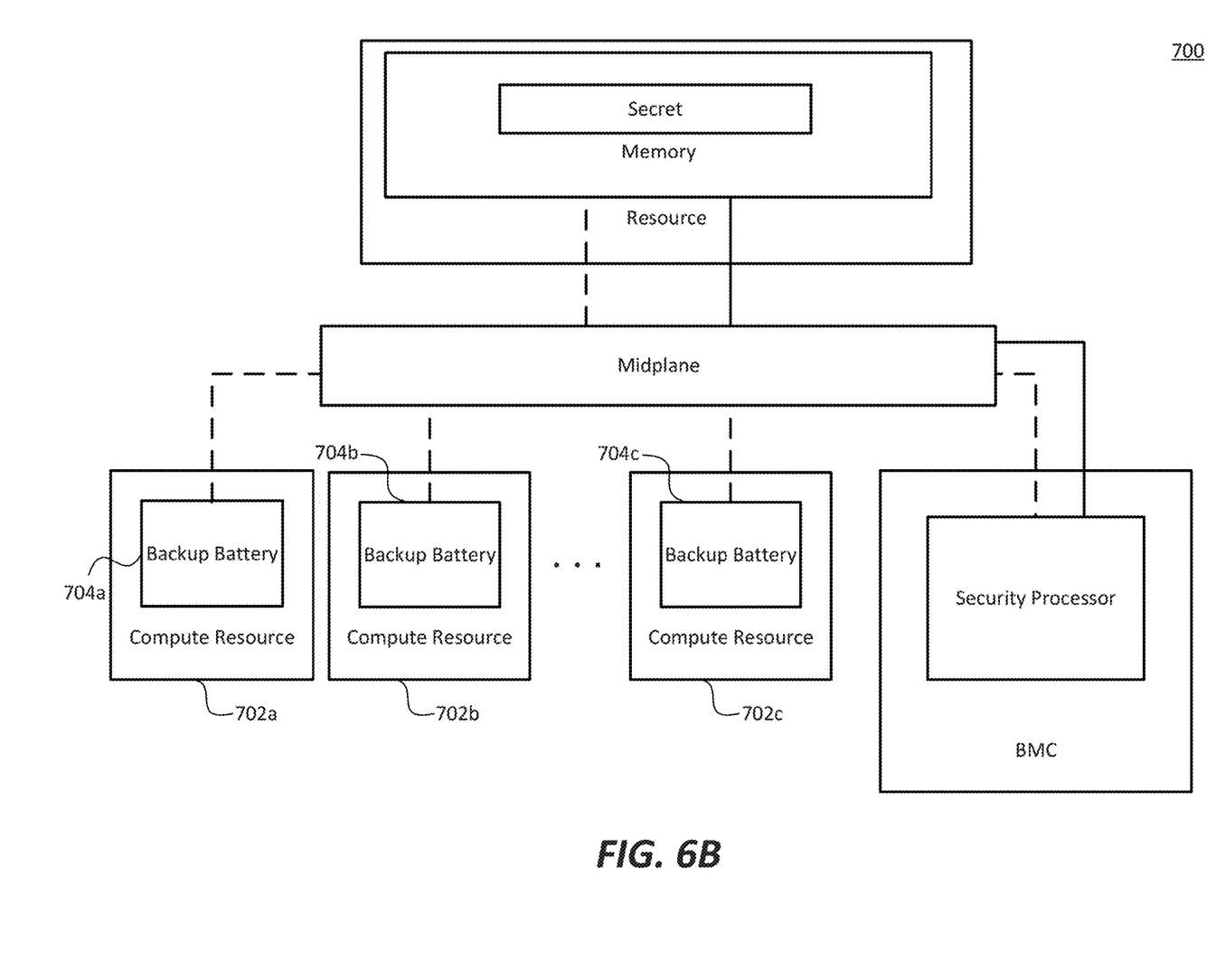
FIG. 6B illustrates an example security circuitry powered by auxiliary power sources contained within multiple compute resources.

FIG. 6B illustrates another example modular server 700 including multiple auxiliary power sources 704a-c in multiple compute resources 702a. In comparison to modular server 600, modular server 700 contains an auxiliary power system that is powered by multiple auxiliary power sources 704a-c. In certain examples, compute resources 702a-c may contain auxiliary power sources 704a-c for use within the respective compute resource 702a-c. For example, auxiliary power sources 704a-c may be megacell batteries for permitting a safe shutdown of their respective compute resources 702a-c when main power is lost to modular server 700. In certain examples, auxiliary power sources 704a-c provide power to their respective compute resources 702a-c and also provide auxiliary power to modular server 700 through battery terminals.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

The invention claimed is:

1. A method, comprising:
charging an auxiliary power source within a modular server enclosure that includes a midplane, a security processor, and a plurality of resources;
transmitting power from the auxiliary power source to the security processor and the plurality of resources through a power circuitry of the midplane and a plurality of power terminals;
powering, with the transmitted power, the security processor and one or more security circuitries included within the plurality of resources; and
determining, at the security processor, that a security intrusion has occurred.

2. The method of claim 1, further comprising irretrievably deleting, by each of the security circuitries, a secret within a memory upon determining that the security intrusion has occurred.

3. The method of claim 1, wherein auxiliary power source is retained within a resource that is locked to the modular server enclosure.

4. The method of claim 1, wherein the auxiliary power source provides power to the plurality of security circuitries for a pre-determined period of time.

5. A modular server enclosure, including:
an auxiliary power source;
a midplane;
a plurality of resources received within the modular server enclosure that include one or more security circuitries enabled during manufacture; and
an auxiliary power system including:
a battery terminal on the midplane and electrically coupled to the auxiliary power source;
a plurality of power terminals, each electrically coupled to a respective one of the plurality of resources; and
a power circuitry on the midplane electrically coupled to the battery terminal and to each of the plurality of power terminals such that the auxiliary power source can supply power to the one or more security circuitries included within the plurality of resources via the auxiliary power system.

6. The modular server enclosure of claim 5, wherein the auxiliary power source is on a resource locked to the modular server enclosure.

7. The modular server enclosure of claim 5, wherein the auxiliary power source is included within a storage resource that is locked to the modular server enclosure.

8. The modular server enclosure of claim 5, wherein the auxiliary power source comprises a plurality of interconnected batteries retained within compute resources of the modular server enclosure.

9. The modular server enclosure of claim 5, wherein a subset of the plurality of resources contain the one or more security circuitries and another subset of the plurality of resources do not contain security circuitries.

10. The modular server enclosure of claim 5, wherein each of the plurality of security circuitries retains a secret within a memory.

11. The modular server enclosure of claim 10, wherein each of the plurality of security circuitries irretrievably deletes the secret within the respective memories when a security intrusion is detected.

12. The modular server enclosure of claim 5, comprising:
a security processor that is electrically coupled to the power circuitry such that the auxiliary power source can supply power to the security processor, wherein the security processor is to control the one or more security circuitries.

13. The modular server enclosure of claim 12, wherein the security processor is to monitor for security intrusions and, responsive to detecting a security intrusion, instruct the one or more security circuits to delete a secret.

* * * * *